United States Patent [19]
Sakai et al.

[11] Patent Number: 5,722,295
[45] Date of Patent: Mar. 3, 1998

[54] INJECTION-MOLDED GEAR FOR ENGINE AND MANUFACTURING METHOD THEREFOR

[75] Inventors: Mitsugu Sakai, Oomiya; Yoshimitsu Tateno, Nogi-machi; Kiyoshi Arai, Oomiya; Katsuharu Morioka, Kani, all of Japan

[73] Assignee: Fuji Jukogyo Kabushiki Kaisha, Tokyo, Japan

[21] Appl. No.: 719,872

[22] Filed: Sep. 25, 1996

[30] Foreign Application Priority Data

Sep. 28, 1995 [JP] Japan .................... 7-251579

[51] Int. Cl.⁶ .................... F16H 55/06; F16H 55/14
[52] U.S. Cl. .................... 74/443; 29/893.37; 74/DIG. 10; 264/259; 264/328.17; 264/331.19; 264/101
[58] Field of Search .................... 74/443, DIG. 10; 29/893.37; 264/259, 331.19, 328.17, 101, 102

[56] References Cited

U.S. PATENT DOCUMENTS

| | | | |
|---|---|---|---|
| 4,110,054 | 8/1978 | Moeller Jr. ............ | 74/DIG. 10 X |
| 4,433,964 | 2/1984 | Holtzberg et al. ......... | 74/DIG. 10 X |
| 4,715,243 | 12/1987 | Morishita et al. ......... | 74/DIG. 10 X |
| 4,777,204 | 10/1988 | Ikenaga et al. .......... | 264/331.19 X |
| 5,059,464 | 10/1991 | Mikuni .................. | 74/DIG. 10 X |

FOREIGN PATENT DOCUMENTS

| | | |
|---|---|---|
| 57-137762 | 8/1982 | Japan . |
| 6-63973 | 3/1994 | Japan . |

*Primary Examiner*—Allan D. Herrmann
*Attorney, Agent, or Firm*—Beveridge, DeGrandi, Weilacher & Young, LLP

[57] ABSTRACT

An injection-molded gear for an utility engine has a high reliability, tenacity, and accuracy, capable of being manufactured at low cost without requiring cutting, and ensuring a substantial reduction in noise. An inner part of a cam crankshaft gear is formed of an insert ring of a sintered iron alloy. An outside portion and a toothed crest portion of the gear are formed by injection-molding a polyamide resin such as nylon 66 and heat-treating the resulting molded product so that its relative viscosity is equal to or larger than 3.5. The relative viscosity is defined as $\eta/\eta_0$ where $\eta_0$ is a viscosity of sulfuric acid of 98% concentration and $\eta$ is a viscosity of a solution of the 98% sulfuric acid in which the polyamide resin is dissolved at a concentration of 1.0%.

15 Claims, 5 Drawing Sheets

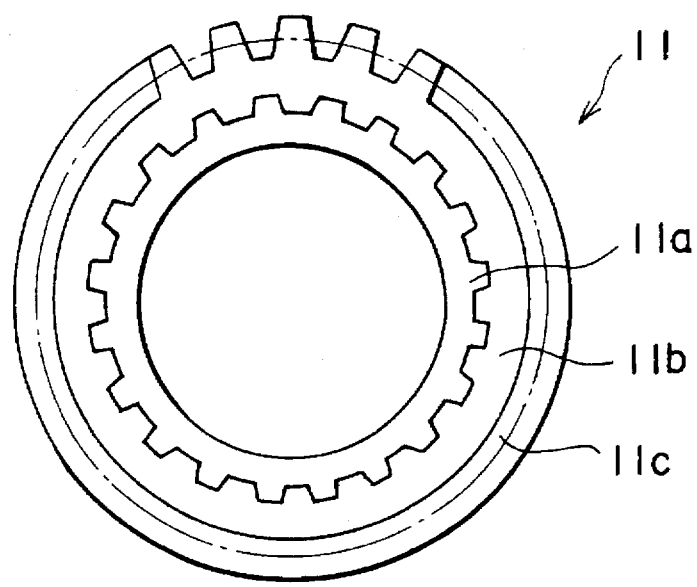
F I G. I A
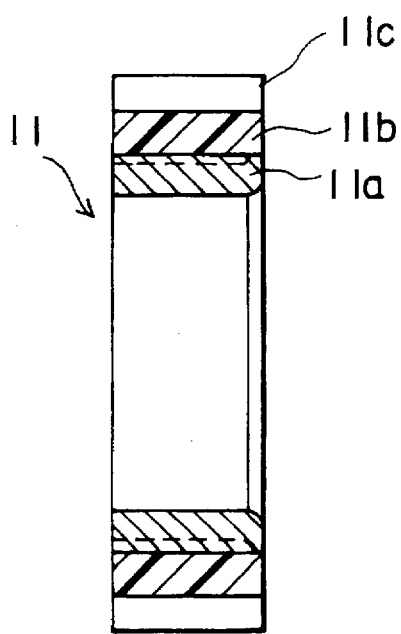
F I G. I B
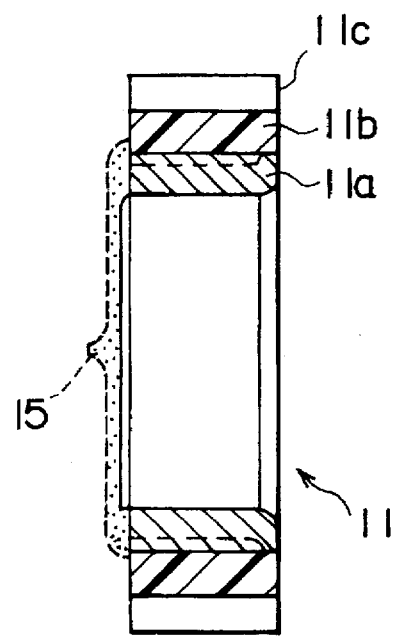
F I G. I C

INJECTION-MOLDED GEAR FOR ENGINE AND MANUFACTURING METHOD THEREFOR

BACKGROUND OF THE INVENTION

1. Field of the Invention

The present invention relates to an injection-molded gear used for a utility engine, exposed to high-temperature lubricating oil under high-load operating conditions, and a method for manufacturing the gear.

2. Information of the Related Art

In general, high-temperature lubricating oil is stored in a crankcase of a utility engine so that the engine can be operated under high-load operating conditions for a long period of time. Accordingly, a pair of metal gears are used as a crankshaft gear and a timing gear (cam gear) in the crankcase, for example. The metal gears, however, produce big sound or noise as they engage each other or turn against each other with a backlash therebetween. In order to reduce the noises produced by the gears, attempts have been made to improve the working and mounting or installation accuracies of each gear or to precisely control the backlash of the gears. Although scissors gears, which are free from backlash, are used for this purpose, they cost relatively high.

Recently, there has been made a proposal to reduce the noise by replacing the metal gears with resin gears. Generally, resin gears produce small noise. If resin gears are used in an engine, as in the case described in Japanese Pat. Appln. Laid-Open Publication No. 57-137762, however, the resin gears must be formed of a reinforced material that contains a base material, such as a polyamide resin, and glass fiber or the like, in order to maintain a required strength, wear resistance, etc. If mating gears are metallic, however, the glass fiber in the resin gears gives an abrasive action or friction to the mating gears. Since the resin is strengthened by the glass fiber its hardness is too high to secure a satisfactory noise reduction effect and tends to produce an unpleasant noise.

Instead of reinforcing the gears with glass fiber or the like, a monomer-cast (MC) resin may be used as a material that can secure the necessary strength without the use of glass fiber. Although this gear material has a remarkable noise reduction effect and is excellent in wear resistance and durability, it cannot be easily injection-molded due to its high viscosity. Accordingly, the gears must be manufactured by cutting a round-bar or ring-shaped material, thus entailing higher manufacturing costs, including additional processing cost for cutting as well as material cost, than those of the metal gears.

A gear that is formed of a phenolic resin containing a reinforcing material is disclosed in Japanese Pat. Appln. Laid-Open Publication No. 6-63973. The gear, however, is unsuited for injection molding and increases a processing cost for cutting.

It is generally known, as described above, that the gear noise level can be considerably lowered by using the resin gears in place of the metal gears. On the other hand, conventional resins for injection molding are easily deformed and broken in high-temperature lubricating oil under high-load operating conditions. Therefore, high-viscosity resin materials are expected to be used for this purpose. However, such high-viscosity resins are inferior in capability of being injection-molded. If they are injection-molded, the resulting molded products are liable to be defective, possibly resulting in breakage during the molding.

On the other hand, while extrusion-formed products have outstanding strength, they need cutting. Compositions which contain glass fiber and/or an inorganic filler for reinforcement inevitably act abrasively on mating gears, as mentioned before, though they have an improved wear resistance.

High-tenacity gears may be obtained by rapidly polymerizing resins in a mold. Such gears, however, are so low in accuracy in shape that they require subsequent cutting, and are liable to suffer internal defects, thus lacking reliability.

SUMMARY OF THE INVENTION

An object of the present invention is to provide an injection-molded gear for an engine, having high reliability, tenacity, and accuracy, which is capable of being manufactured at low cost without requiring machining, and enables a substantial reduction in noise, and a method for manufacturing the injection-molded gear.

Another object of the invention is to provide an injection-molded gear for an engine, which is excellent in strength and dimensional accuracy, and a method for manufacturing the gear.

Still another object of the invention is to provide an injection-molded gear for an engine, which is capable of preventing mating gears from being worn and of lowering the noise level more effectively without reducing the proper flexibility of a polyamide resin.

In an aspect of the present invention, there is provided an injection-molded gear for an engine, comprising: an inside portion, and a toothed outside portion formed around the inside portion, at least the toothed outside portion being molded from a polyamide resin, the portion of the polyamide resin having a relative viscosity equal to or larger than 3.5, the relative viscosity being defined as $\eta/\eta_0$ where $\eta_0$ is a viscosity of sulfuric acid of 98% concentration and $\eta$ is a viscosity of a solution of the 98% sulfuric acid in which the polyamide resin is dissolved at a concentration of 1.0%.

The injection-molded gear formed in this manner is a low-noise resin gear that requires no machining or cutting, and the relative viscosity not lower than 3.5 ensures high tenacity and strength.

The injection-molded gear may comprise an insert ring as the outside portion. In this case, the toothed portion is integrally molded around the insert ring.

The injection-molded gear formed in this manner is also a low-noise resin gear that requires no machining or cutting or the like, and the relative viscosity not lower than 3.5 ensures high tenacity and strength. Moreover, the use of the insert ring improves the strength and dimensional accuracy of the gear.

Preferably, the polyamide resin contains neither glass fiber nor an inorganic filler. In this case, mating gears cannot be worn by the resin gear, and the noise level can be lowered more effectively without reducing the proper flexibility of the polyamide resin.

According to another aspect of the invention, there is provided a method for manufacturing an injection-molded gear for an engine, comprising the steps of injection-molding a polyamide resin into a toothed gear configuration to obtain a molded product, and heat-treating the molded product to have a relative viscosity equal to or larger than 3.5, the relative viscosity being defined as $\eta/\eta_0$ where $\eta_0$ is a viscosity of sulfuric acid of 98% concentration and $\eta$ is a viscosity of a solution of the 98% sulfuric acid in which the polyamide resin is dissolved at a concentration of 1.0%.

The method may further comprise the steps of providing an insert ring of a metal, and thereafter carrying out the step of injection-molding around the insert ring.

Preferably, the heat treatment is carried out in a vacuum not higher than −500 mmHg or in an inert gas, such as nitrogen or helium gas. Further, preferably, the heat treatment is carried out at a temperature higher than half the melting point of the polyamide resin and lower than the melting point by 10° C.

BRIEF DESCRIPTION OF THE DRAWINGS

FIG. 1A is a front view of an injection-molded gear according to a first embodiment of the present invention;

FIG. 1B is an axial sectional view of the gear shown in FIG. 1A;

FIG. 1C is a view similar to FIG. 1B but showing how an injection molding is carried out;

DESCRIPTION OF THE PREFERRED EMBODIMENTS

Preferred embodiments of the present invention will become understood from the following detailed description referring to the accompanying drawings.

Figure 2:
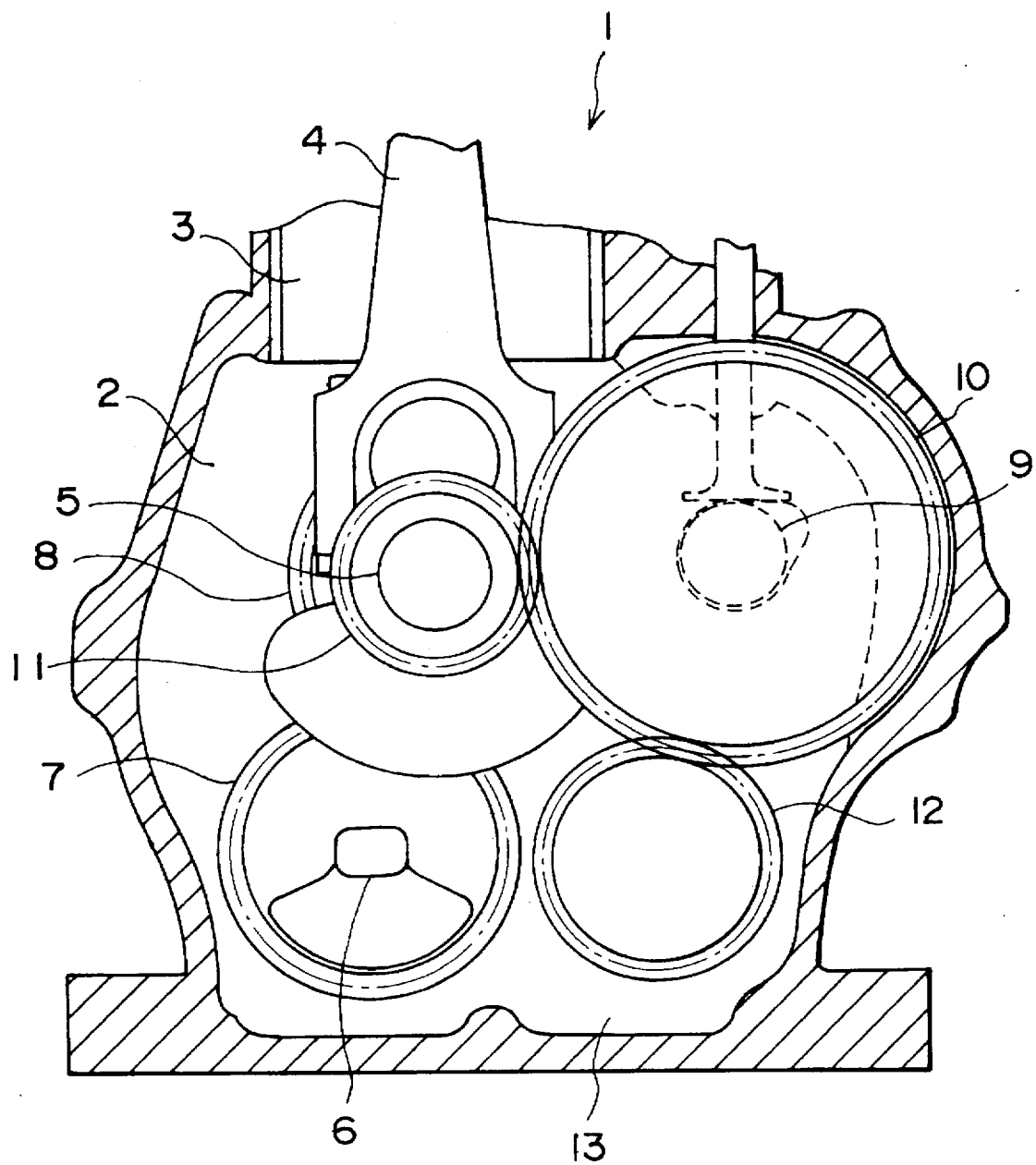
FIG. 2 is a schematic view showing the gear in an engine.

FIGS. 1A to 2 show a first embodiment of the present invention. Referring to FIG. 2, numeral 1 denotes an engine body having a crankcase 2. The crankcase 2 encloses a crankshaft 5, which is rotated by means of a connecting rod 4 as a piston (not shown) reciprocates in a cylinder 3. Mounted on one end of the crankshaft 5 is a crankshaft gear 8 for a balancer, which is in mesh with a balancer gear 7 mounted on one end of a balancer shaft 6. Mounted on the other end of the crankshaft 5 is a cam crankshaft gear 11, which is in mesh with a cam gear (timing gear) 10 on one end of a camshaft 9. The cam gear 10 is in mesh with a governor gear 12.

A scraper (not shown) is fixed to the underside of a larger end portion of the connecting rod 4. The scraper is used to scrape up lubricating oil stored in an oil pan 13 at the bottom of the crankcase 2 and to lubricate the inner wall of the cylinder 3 and various sliding parts including the crankshaft 5, balancer shaft 6, camshaft 9, etc.

As shown in FIGS. 1A and 1B, an inside part of the crankshaft gear 11 is formed of an insert ring 11a of sintered iron alloy. An outside toothed portion 11b with a tooth part 11c, integrally provided around the ring 11a, is formed by injection-molding a polyamide resin such as nylon 66 and heat-treating the resulting molded product so that its relative viscosity η r is equal to or larger than 3.5 (η r≧3.5). The relative viscosity η r is given by the equation (1).

$$\eta r = \eta / \eta_0 \quad (1)$$

where $\eta_0$ is a viscosity of sulfuric acid of 98% concentration sold on the market and $\eta$ is a viscosity of a solution of the 98% sulfuric acid in which the polyamide resin is dissolved at a concentration of 1.0%. The viscosity of the sulfuric acid is given by measuring a time (in second) needed for a predetermined amount of the sulfuric acid to flow down a capillary pipe by a predetermined vertical distance. The viscosity of the solution of the 98% sulfuric acid in which the polyamide resin is dissolved at a concentration of 1.0% is also given by the same method as above. The above method of determining the relative viscosity is defined in JIS-K-6810 (JIS=Japanese Industrial Standards).

In forming the cam crankshaft gear 11, a polyamide resin such as nylon 66 is injected into the region around the outer periphery of the insert ring 11a, as shown in FIG. 1C, through a gate 15 that is located near the central portion of one axial side of the ring 11a. The polyamide resin contains no reinforcing material (glass fiber or inorganic filler), and flows radially outward toward the outer peripheral portion of the insert ring 11a through the single gate 15 substantially in the center of the ring 11a. Accordingly, the polyamide resin can flow uniformly without rounding or involution.

After the injection molding, a surplus volume of the polyamide resin injected through the gate 15 is removed. The tooth portion 11c of the crankshaft gear 11 is already completed by the time the injection molding is completed. The tooth portion 11c requires no gear cutting or the like.

The injection-molded product is subjected to annealing under vacuum, and a heat treatment, so that its relative viscosity η r is equal to or larger than 3.5. More specifically, during the heat treatment, a vacuum condition is established such that its degree of vacuum PS is equal to or smaller than −500 mmHg, and the temperature is kept at a level higher than half the melting point of the polyamide resin (nylon 66) and lower than the melting point by 10° C. Alternatively, the heat treatment may be carried out in an inert gas, such as nitrogen or helium gas.

Figure 3:
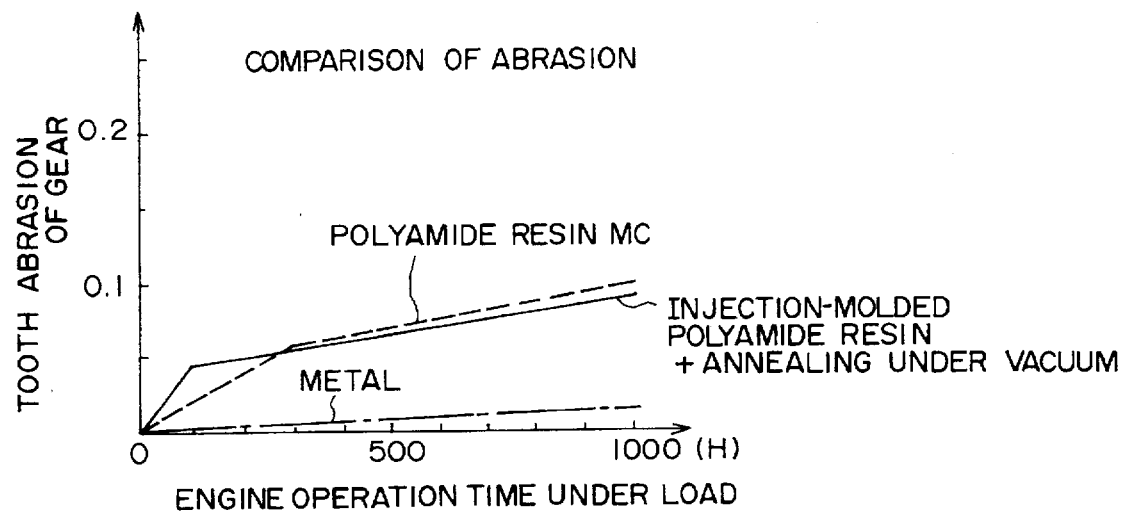
FIG. 3 is a diagram showing results of comparative measurement of wear resistance of the gear.

FIG. 3 shows results of measurement of tooth abrasion on different materials for the cam crankshaft gear, with elapse of engine operation time under load. The results were obtained by comparatively measuring the tooth abrasion with time on three types of gears; a metal gear (conventional gear, indicated by chain line in FIG. 3), a monomer-cast (MC) polyamide resin gear (cut gear, indicated by broken line), and a polyamide resin (nylon 66) gear heat-treated under the aforesaid conditions (gear according to the first embodiment of the invention, indicated by solid line).

The measurement results indicate that the metal gear exhibited the least tooth abrasion, as expected. The tooth abrasion of the gear according to the first embodiment of the invention was found to be equal to or less than that of the MC gear after elapse of long time, and the amount of abrasion is considered to involve no problem for actual use.

Thus, although the gear according to the first embodiment of the invention is somewhat inferior to the metal gear in the resistance to abrasion, the level of tooth abrasion can be regarded as practically negligible. While the MC gear requires machining or cutting, the gear according to the first embodiment requires no cutting, so it can be manufactured at reduced cost.

Figure 4:
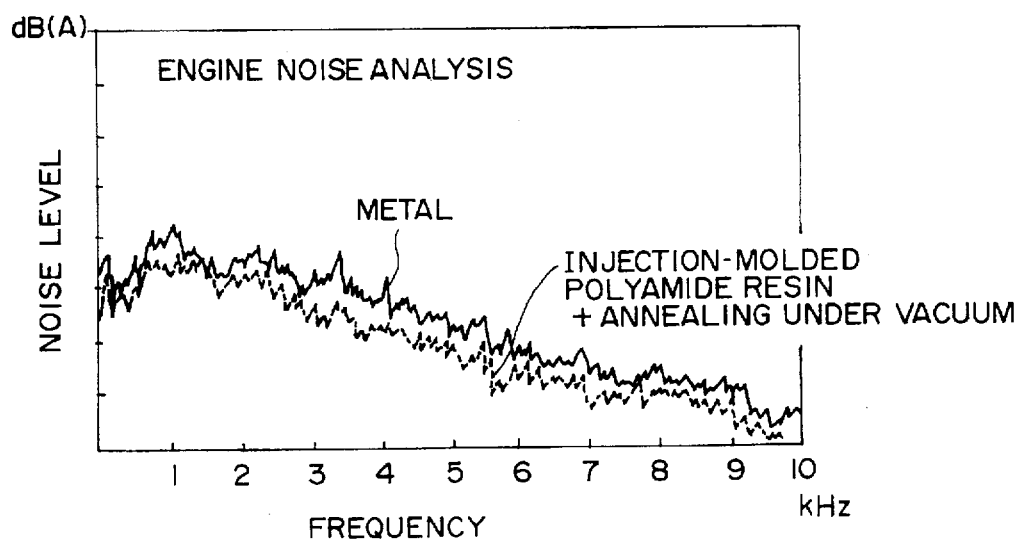
FIG. 4 is a diagram showing results of measurement of engine operation noise level.

FIG. 4 shows results of a noise frequency analysis conducted during engine operation. The results were obtained by comparatively measuring the engine operation noise level on two types of gears; a metal gear (conventional gear, indicated by solid line in FIG. 4) and a polyamide resin (nylon 66) gear heat-treated under the aforesaid conditions (gear according to the first embodiment of the invention, indicated by broken line). The results of the analysis indicate that the noise level of an engine that uses the gear according to the first embodiment of the invention as a cam crankshaft gear is lower than that of an engine that uses the metal gear, substantially throughout the frequency band. It will be understood that a remarkable noise reduction effect is obtained according to this embodiment.

The gear according to the first embodiment of the present invention is heat-treated so that its relative viscosity ηr is equal to or larger than 3.5 after injection molding. Such gear has a high tenacity and good wear resistance. Further, since the gear according to this embodiment is formed with use of the insert ring, it is excellent in strength and dimensional accuracy and is highly reliable. Moreover, since it can be formed by injection molding, the gear of this type, unlike the MC gear, can be manufactured at low cost without requiring gear cutting. Since the polyamide resin contains no reinforcing material, furthermore, the noise level can be lowered more effectively without reducing the proper flexibility of the polyamide resin, and mating gears are not worn by the reinforcing material.

Figure 5A:
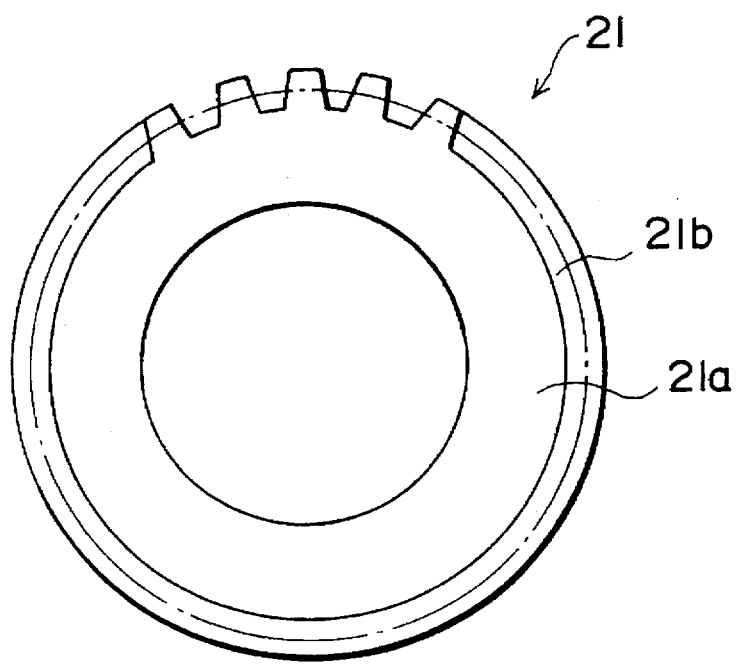
FIG. 5A is a front view of an injection-molded gear according to a second embodiment of the invention.
Figure 5B:
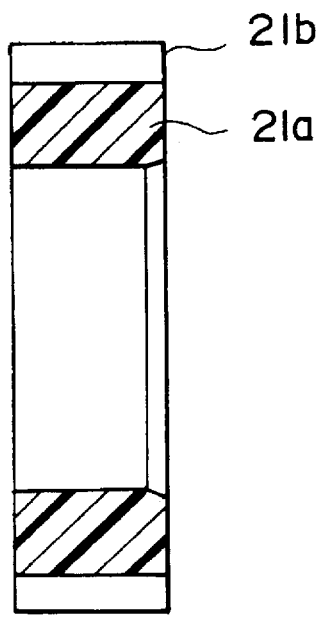
FIG. 5B is an axial sectional view of the gear shown in FIG. 5A.

FIGS. 5A and 5B show a second embodiment of the present invention. In forming a cam crankshaft gear according to this embodiment, the polyamide resin is injection-molded without using an insert ring, and the injection-molded polyamide resin gear is heat-treated in the same manner as in the case of the first embodiment.

As shown in FIGS. 5A and 5B, an inside portion 21a and a toothed portion 21b of a cam crankshaft gear 21 are both formed by injection-molding a polyamide resin, which is nylon 66, and heat-treating the resulting molded product so that its relative viscosity ηr as defined before is equal to or larger than 3.5.

Figure 6:
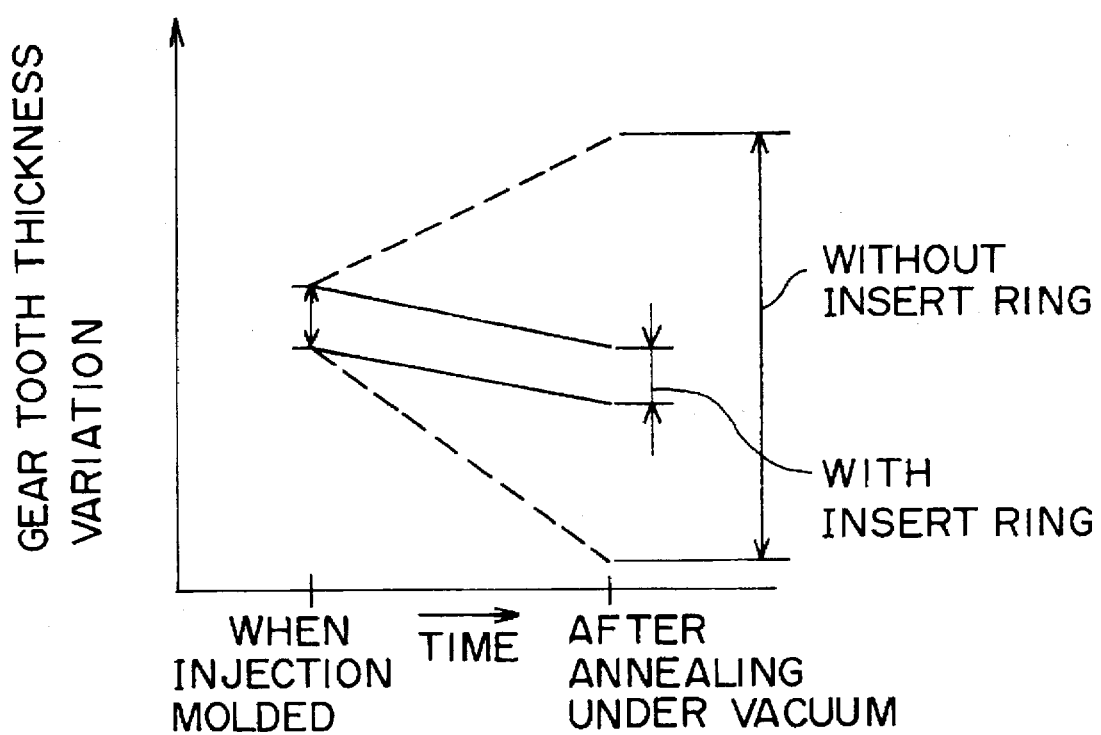
FIG. 6 is a diagram showing results of measurement of variations in gear tooth thickness according to the second embodiment.

FIG. 6 shows results of measurement of variations in gear tooth thickness after injection molding and after heat treatment (annealing under vacuum). The results are based on the comparison between a gear with an insert ring according to the first embodiment and a gear without an insert ring according to the second embodiment.

While the two gears were subject to substantially equal variations in tooth thickness immediately after the injection molding, the gear without an insert ring suffered larger variations, though practically negligible, after the annealing under vacuum.

Thus, the gear without an insert ring according to the second embodiment of the present invention, as compared with the gear with an insert ring, is somewhat inferior in accuracy but strong enough for practical use.

Although nylon 66 is used as the polyamide resin according to the embodiments described above, it may be replaced with any other polyamide resins, such as nylons 6, 46, 11, 12, 610, 612, 66/6I and 66/6T or mixtures of these nylons.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An injection-molded gear for an engine, comprising:
   an inside portion; and
   a toothed outside portion formed around said inside portion,
   at least said toothed outside portion being molded from a polyamide resin, said portion of the polyamide resin having a relative viscosity equal to or larger than 3.5, said relative viscosity being defined as $\eta/\eta_0$ where $\eta_0$ is a viscosity of sulfuric acid of 98% concentration and $\eta$ is a viscosity of a solution of the 98% sulfuric acid in which the polyamide resin is dissolved at a concentration of 1.0%.

2. The injection-molded gear according to claim 1, wherein:
   said polyamide resin is a sole constituent of the gear.

3. The injection-molded gear according to claim 1, wherein:
   said inside portion comprises an insert ring separate from said toothed outside portion, said toothed outside portion being integrally molded around said insert ring.

4. The injection-molded gear according to claim 3, wherein:
   said polyamide resin is a sole constituent of the toothed outside portion.

5. The injection-molded gear according to claim 3, wherein:
   said insert ring is made of a metal.

6. The injection-molded gear according to claim 5, wherein:
   said metal is a sintered iron alloy.

7. A method for manufacturing an injection-molded gear for an engine, comprising the steps of:
   molding a polyamide resin to form a toothed gear configuration to obtain a molded product; and
   processing the molded product to have a relative viscosity equal to or larger than 3.5, said relative viscosity being defined as $\eta/\eta_0$ where $\eta_0$ is a viscosity of sulfuric acid of 98% concentration and $\eta$ is a viscosity of a solution of the 98% sulfuric acid in which said polyamide resin is dissolved at a concentration of 1.0%.

8. The method according to claim 5, further comprising the steps of:
   providing an insert ring of a metal; and
   thereafter carrying out said step of molding around said insert ring.

9. The method according to claim 7, wherein:
   said step of processing is carried out in a vacuum.

10. The method according to claim 9, wherein:
    said vacuum is equal to or smaller than −500 mmHg.

11. The method according to claim 7, wherein:
    said step of processing is carried out in an inert gas.

12. The method according to claim 11, wherein:
    said inert gas is nitrogen.

13. The method according to claim 11 wherein:
    said inert gas is helium.

14. The method according to claim 7, wherein said step of processing is carried out at a temperature higher than half a melting point of the polyamide resin and lower than the melting point by 10° C.

15. The method according to claim 7, wherein:
    said viscosities are determined by measuring times needed for a predetermined amount of said sulfuric acid and the same amount of said solution to flow down a pipe by a predetermined vertical distance, respectively.

* * * * *